US012248886B2

(12) United States Patent
More et al.

(10) Patent No.: US 12,248,886 B2
(45) Date of Patent: Mar. 11, 2025

(54) METHOD AND SYSTEM FOR EXTRACTION OF CAUSE-EFFECT RELATION FROM DOMAIN SPECIFIC TEXT

(71) Applicant: Tata Consultancy Services Limited, Mumbai (IN)

(72) Inventors: Ravina Vinayak More, Pune (IN); Sachin Sharad Pawar, Pune (IN); Girish Keshav Palshikar, Pune (IN); Swapnil Hingmire, Pune (IN); Pushpak Bhattacharyya, Patna (IN); Vasudeva Varma Kalidindi, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 1010 days.

(21) Appl. No.: 17/209,995

(22) Filed: Mar. 23, 2021

(65) Prior Publication Data
US 2022/0207400 A1 Jun. 30, 2022

(30) Foreign Application Priority Data
Nov. 21, 2020 (IN) .............................. 202021050762

(51) Int. Cl.
*G06F 40/30* (2020.01)
*G06F 40/205* (2020.01)
(Continued)

(52) U.S. Cl.
CPC ........... *G06N 5/046* (2013.01); *G06F 40/205* (2020.01); *G06F 40/284* (2020.01); *G06F 40/289* (2020.01); *G06F 40/30* (2020.01)

(58) Field of Classification Search
CPC ..................................................... G06F 40/30
See application file for complete search history.

(56) References Cited

U.S. PATENT DOCUMENTS

2018/0224831 A1* 8/2018 Liu .................... G05B 23/0232
2018/0260474 A1 9/2018 Surdeanu et al.
(Continued)

FOREIGN PATENT DOCUMENTS

CN 109726293 B * 12/2020

OTHER PUBLICATIONS

Pawar, Sachin et al., "Cause-Effect Relation Extraction from Documents in Metallurgy and Materials Science", Transactions of the Indian Institute of Metals, Apr. 2019, vol. 72, pp. 2209-2217, Springer, https://web2py.iiit.ac.in/research_centres/publications/download/article.pdf.9478ff41c82b2d41.4361757365e2809345666 66563742052656c6174696f6e20457874726163746964766t6e2066726t6 d20446163756d656e747320696e204d6574616c6c7572677920616 e64204d6174657269616c7320536369656e63652e706456.pdf.

(Continued)

*Primary Examiner* — Feng-Tzer Tzeng
(74) *Attorney, Agent, or Firm* — FINNEGAN, HENDERSON, FARABOW, GARRETT & DUNNER LLP

(57) ABSTRACT

This disclosure relates generally to extraction of cause-effect relation from domain specific text. Cause-effect relation highlights causal relationship among various entities, concepts and processes in a domain specific text. Conventional state-of-the-art methods use named entity recognition for extraction of cause-effect (CE) relation which does not give precise results. Embodiments of the present disclosure provide a knowledge-based approach for automatic extraction of CE relations from domain specific text. The present disclosure method is a combination of an unsupervised machine learning technique to discover causal triggers and a set of high-precision linguistic rules to identify cause/effect arguments of these causal triggers. The method extracts the CE relation in the form of a triplet comprising (Continued)

a causal trigger, a cause phrase and an effect phrase identified from the domain specific text. The disclosed method is used for extracting CE relations in biomedical text.

11 Claims, 3 Drawing Sheets

(51) Int. Cl.
*G06F 40/284* (2020.01)
*G06F 40/289* (2020.01)
*G06N 5/046* (2023.01)

(56) References Cited

U.S. PATENT DOCUMENTS

2021/0286948 A1* 9/2021 Kruengkrai ............... G06N 3/04
2022/0043702 A1* 2/2022 Haines ................ G06F 11/0772

OTHER PUBLICATIONS

Dasgupta, Tirthankar et al., "Automatic Extraction of Causal Relations from Text using Linguistically Informed Deep Neural Networks", Annual SIGdial Meeting on Discourse and Dialogue, 2018, pp. 306-316, Springer, https://www.aclweb.org/anthology/W18-5035.pdf.

Sharma, Raksha et al., "An Unsupervised Approach for Cause-Effect Relation Extraction from Biomedical Text", Natural Language Processing and Information Systems, Jan. 2018, pp. 419-427, Springer, https://www.springerprofessional.de/en/an-unsupervised-approach-for-cause-effect-relation-extraction-fr/15787646.

Gopalan, Sindhuja et al., "Cause and Effect Extraction from Biomedical Corpus Title of the item: Natural Language Processing and Information Systems", Jan. 2018, vol. 21, Scielo, http://www.scielo.org.mx/scielo.php?script=sci_arttext&pid=S1405-55462017000400749#:~:text=The%20ojective%20of%20the%20present,lrom%20discourse%20analyzed%20biomedical%20corpus.&text=The%20cause%20and%20effect%20is.effect%20of%20the%20first%20event.

* cited by examiner

METHOD AND SYSTEM FOR EXTRACTION OF CAUSE-EFFECT RELATION FROM DOMAIN SPECIFIC TEXT

PRIORITY CLAIM

This US patent application claims priority under 35 U.S.C. § 119 to Indian provisional patent application no. 202021050762, filed on Nov. 21, 2020.

TECHNICAL FIELD

The disclosure herein generally relates to natural language processing, and, more particularly, to a method and system for extraction of cause-effect relation from domain specific text.

BACKGROUND

The text present in any specific domain (for example biomedical) is growing day by day. Effective extraction of knowledge from the immense amount of text to find solutions for certain problems associated with the domain application is a key problem to be solved. Especially immense text in the biomedical domain is growing day by day in the form of research papers, case reports, patient health records, health related Question-Answering (QA) forums and even social media. Several research publications are being generated every day in the biomedical domain, especially in times such as the ongoing COVID-19 pandemic. Such publications contain a significant amount of knowledge in the form of information. This knowledge, if carefully extracted, can be further processed and analyzed to derive meaningful insights. Cause-Effect (CE) relation is one such important knowledge element which highlights causal relationship among various entities, concepts and processes in a text.

The state-of-the-art text mining systems is error prone due to the challenges and complexity of Natural Language Processing (NLP). To extract causal pairs from text, for example, A causes B, the common approach followed in many prior methods is finding Unified Medical Language System (UMLS) concepts or Named Entities in the sentence first, and then finding if a cause-effect relation exists among them. The drawback with this approach is that it misses out on those cause-effect pairs in which Named Entity Recognition (NER) gets missed out due to incorrect spelling, non-availability in the corpus or an NER algorithm that fails to identify the entities. Also, if the Named Entities are far apart in a sentence, traditional techniques fail to identify the CE Relation among them. Some prior methods extract named entities first, and then finds the relations between them. This can lead to missing out certain instances where the named entities were not retrieved. Some prior methods annotate cause/effect phrase and further a network model is trained. However, these methods require a considerable amount of manual annotation and requires a huge amount of time. Few other prior methods use simple techniques such as WordNet to eliminate non-causal cause-effect phrases to find out cause-effect relation in a text which may lead to errors in the extraction. The state-of-the-art methods for extraction of cause-effect relation involves manual annotation, or usage of named entities which may lead to errors and huge amount of time.

SUMMARY

Embodiments of the present disclosure present technological improvements as solutions to one or more of the above-mentioned technical problems recognized by the inventors in conventional systems. For example, in one embodiment, a method for extraction of cause-effect relation from domain specific text is provided.

In an aspect, there is provided a processor implemented method for extraction of cause-effect relation from domain specific text. The method comprises: receiving the domain specific text and a causal trigger set, wherein the domain specific text comprises a set of sequence of words; generating a dependency parse tree of the domain specific text; identifying causal triggers in the domain specific text using the causal trigger set, if the causal triggers are an element of the causal trigger set; and extracting a set of cause-effect relation(s) for each of the causal triggers from the domain specific text, wherein each of the cause effect relation in the set of cause-effect relations is represented as a triplet, the triplet includes (i) a cause phrase (ii) a causal trigger out of the identified causal triggers and (iii) an effect phrase, the extracting comprising: extracting a set of features for each pair of words in the domain specific text using a first set of predefined rules wherein one of the words in each pair of words is a causal trigger; obtaining a headword label for each word of the set of words from the set of features using one of (i) a trained classifier or (ii) a combination of the trained classifier and a second set of predefined rules, wherein the headword label is one or more of (i) cause headword, (ii) effect headword or (iii) negative; expanding, using the dependency parse tree, the headword label to obtain: cause phrase, if the headword label is classified as cause headword, and effect phrase, if the headword label is classified as effect headword; and updating each of the set of cause effect relation for each of the causal trigger using the cause phrase, the causal trigger and the effect phrase.

In another aspect, there is provided a system for extraction of cause-effect relation from domain specific text. The system comprises: memory storing instructions; one or more communication interfaces; and one or more hardware processors coupled to the memory via the one or more communication interfaces, wherein the one or more hardware processors are configured by the instructions to receive the domain specific text and a causal trigger set, wherein the domain specific text comprises a set of sequence of words; generate a dependency parse tree of the domain specific text; identify causal triggers in the domain specific text using the causal trigger set, if the causal triggers are an element of the causal trigger set; and extract a set of cause-effect relation(s) for each of the causal triggers from the domain specific text, wherein each of the cause-effect relation in the set of cause-effect relations is represented as a triplet, the triplet includes (i) a cause phrase (ii) a causal trigger out of the identified causal triggers and (iii) an effect phrase, the extracting comprising: extract a set of features for each pair of words in the domain specific text using a first set of predefined rules wherein one of the words in each pair of words is a causal trigger; obtain a headword label for each word of the set of words from the set of features using one of (i) a trained classifier or (ii) a combination of the trained classifier and a second set of predefined rules, wherein the headword label is one or more of (i) cause headword, (ii) effect headword or (iii) negative; expand, using the dependency parse tree, the headword label to obtain: cause phrase, if the headword label is classified as cause headword, and effect phrase, if the headword label is classified as effect headword; and update each of the set of cause-effect relation for each of the causal trigger using the cause phrase, the causal trigger and the effect phrase.

In an embodiment, the causal trigger set comprises one or more causal triggers stored in a database.

In an embodiment, a causal trigger comprises one or more words invoking a cause-effect relation in the domain specific text.

In an embodiment, the set of features are (i) lexical features (ii) Part-of-speech (POS) tag based features and (iii) dependency based features.

In an embodiment, training the classifier to obtain a trained classifier, the training comprising: receiving a training data and the causal trigger set for training a classifier wherein the training data is a set of annotated sentences wherein each sentence of the set of annotated sentences comprises (i) one or more cause-effect relation and (ii) one or more causal triggers; generating a dependency parse tree for each sentence of the set of sentences in the training data; generating, using the dependency parse tree, a set of cause headword and a set of effect headword for each of the cause-effect relation of the one or more cause-effect relation associated to each of the causal trigger of the one or more causal triggers; obtaining a set of negative headword labels in the training data wherein the set of negative headword labels is a set of words in each sentence of the set of sentences and each word of the set of words is none of (i) a cause headword or (ii) an effect headword; extracting a set of features for the set of cause headword, a set of features for the set of effect headword and a set of features for the set of headword classified as negative using the first set of predefined rules; training the classifier using the set of features and the corresponding headword label.

In an embodiment, the second set of predefined linguistic rules for obtaining the cause headword are one or more of: (i) the cause headword is a nominal subject of the causal trigger verb (ii) the cause headword is a noun adverbial modifier of the causal trigger verb (iii) the cause headword is a prepositional object of the agent of the causal trigger verb (iv) the causal trigger verb is a relative class modifier of the cause headword and the causal trigger word is being modified by 'that' (v) the cause headword is a noun is an object of the causal trigger word 'due' (vi) there exists a Lowest Common Ancestor(LCA) in the dependency parse tree of the domain specific text such that the cause headword is a nominal subject modifier of the LCA and the causal trigger is an object of the preposition of the LCA. (vii) the cause headword is a prepositional object of the preposition ('by') modifying the causal trigger noun. (viii) the causal trigger verb is a relative clause modifier of the cause headword, 'which' is a child of the causal trigger verb, and the cause headword is not an attribute modifier of the cause headword. (ix) there exists a Lowest Common Ancestor (LCA) in the dependency parse tree of the domain specific text such that the cause headword is a passive nominal subject modifier of the LCA and the causal trigger is open clausal complement modifier of the LCA. (x) the root word of the causal trigger word is 'role' and there exists a Lowest Common Ancestor(LCA) in the dependency parse tree of the domain specific text such that the root word of the LCA is 'play', the cause headword is a nominal subject modifier of the LCA and the causal trigger is a direct object modifier of the LCA.

In an embodiment, the second set of predefined linguistic rules for obtaining the effect headword are one or more of: (i) the effect headword is a direct object of the causal trigger verb (ii) the causal trigger verb is an adverbial modifier of the effect headword. (iii) the effect headword is a passive nominal subject modifier of the causal trigger verb. (iv) the causal trigger verb is a clausal modifier of the effect headword which is a noun. (v) the causal trigger word ('because' or 'due') is a prepositional modifier of the effect headword. (vi) the root form of the causal trigger verb is 'lead' and the effect headword is a prepositional object modifier of the preposition ('to') modifying the causal trigger verb. (vii) the root word of the causal trigger is 'cause' or 'reason', the causal trigger verb is modified by the word 'by' and the effect headword is a prepositional object modifier of the preposition ('of') modifying the causal trigger noun. (viii) the root form of the causal trigger verb is 'contribute' and the effect headword is a prepositional object modifier of the preposition ('to') modifying the causal trigger verb. (ix) the root form of the causal trigger verb is 'role' and the effect headword is a prepositional object modifier of the preposition ('in') modifying the causal trigger verb. (x) the causal trigger word 'because' is a marker of the adverbial clause modifier of the effect headword.

In yet another aspect, there are provided one or more non-transitory machine readable information storage mediums comprising one or more instructions which when executed by one or more hardware processors causes at least one of: receiving the domain specific text and a causal trigger set, wherein the domain specific text comprises a set of sequence of words; generating a dependency parse tree of the domain specific text; identifying causal triggers in the domain specific text using the causal trigger set, if the causal triggers are an element of the causal trigger set; and extracting a set of cause-effect relation(s) for each of the causal triggers from the domain specific text, wherein each of the cause-effect relation in the set of cause-effect relations is represented as a triplet, the triplet includes (i) a cause phrase (ii) a causal trigger out of the identified causal triggers and (iii) an effect phrase, the extracting comprising: extracting a set of features for each pair of words in the domain specific text using a first set of predefined rules wherein one of the words in each pair of words is a causal trigger; obtaining a headword label for each word of the set of words from the set of features using one of (i) a trained classifier or (ii) a combination of the trained classifier and a second set of predefined rules, wherein the headword label is one or more of (i) cause headword, (ii) effect headword or (iii) negative; expanding, using the dependency parse tree, the headword label to obtain: cause phrase, if the headword label is classified as cause headword, and effect phrase, if the headword label is classified as effect headword; and updating each of the set of cause-effect relation for each of the causal trigger using the cause phrase, the causal trigger and the effect phrase.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
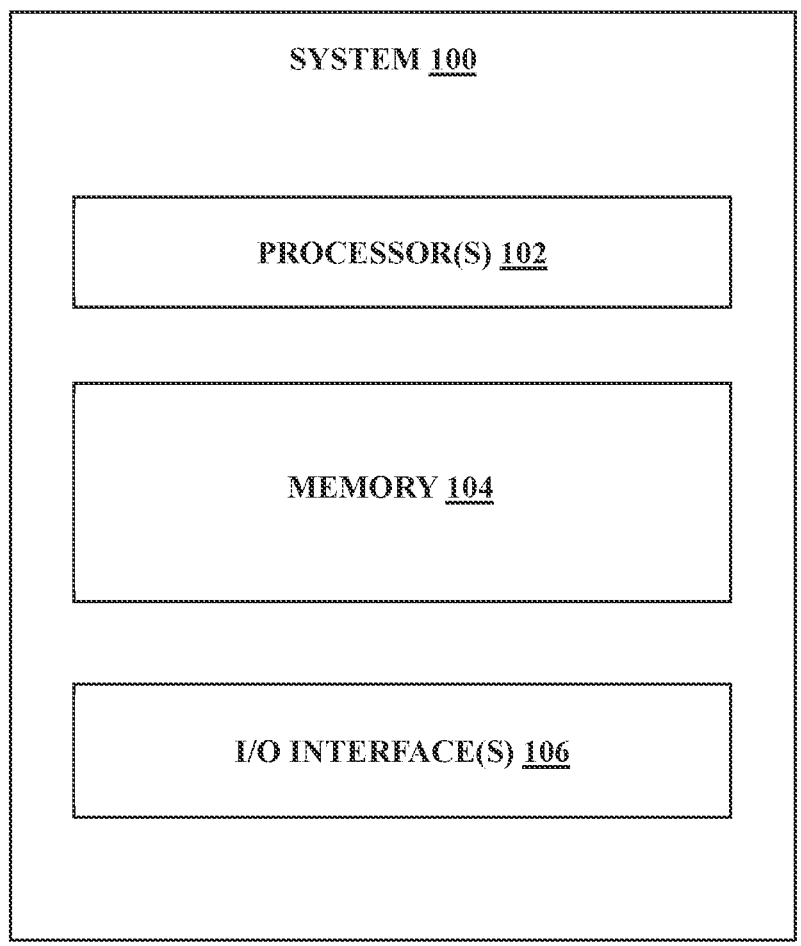
FIG. 1 illustrates an exemplary block diagram of a system for extraction of cause-effect relation from domain specific text, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Immense text present in specific domain is growing day by day. Extracting knowledge from this immense text becomes really challenging. For example, text present in the biomedical domain is growing day by day in the form of research papers, case reports, patient health records, health related Question-Answering (QA) forums and even social media in the field of biomedical domain. The effective extraction of knowledge from this text is key to find solutions to pressing problems in the medical domain such as cancer. Given the scale of this text, it is important to extract this knowledge automatically and store in some machine-readable knowledge representation (e.g., tables or graphs) so that the knowledge can be indexed, queried, analyzed, or inferred further to generate new knowledge. Cause-Effect (CE) relations that denote causal dynamics between entities (e.g., Bortezomib causes proteasome, Shp-2 is upregulated by p210 bcr/abl oncoprotein), capture critical knowledge about the domain. Such knowledge can be utilized for correctly answering questions like—What are the causes for apoptosis of Kasumi-1 cells?, Which drugs given to leukaemia patients cause anaemia as a side effect? and Tell me all causes for cytotoxicity in tumor cells. Table 1 shows some examples of Cause-Effect relations extracted from COVID-19 related abstracts.

TABLE 1

| Sentence | Cause | Trigger | Effect |
|---|---|---|---|
| Transmissible gastroenteritis virus (TGEV) is a coronavirus that causes severe diarrhea in suckling piglets. | Transmissible gastroenteritis virus (TGEV) | causes | severe diarrhea in suckling piglets |
| In common to other viroporins, coronavirus envelope proteins increase membrane permeability to ions. | Coronavirus envelope proteins | increase | Membrane permeability to ions |
| We show that the cell-lethal phenotype of ADAR1 deletion in human lung adenocarcinoma A549 cells is rescued by CRISPR/Cas9 mutagenesis of the RNASEL gene or by expression of the | CRISPR/Cas9 mutagenesis of the RNASEL gene | rescued | The cell-lethal phenotype of ADAR1 deletion in human lung adenocarcinoma A549 cells |
| | expression of the RNase L antagonist | rescued | the cell-lethal phenotype of ADAR1 deletion in human lung adenocarcinoma A549 cells |

TABLE 1-continued

| Sentence | Cause | Trigger | Effect |
|---|---|---|---|
| RNase L antagonist, murine coronavirus NS2 accessory protein. | Murine coronavirus NS2 accessory protein | rescued | the cell-lethal phenotype of ADAR1 deletion in human lung adenocarcinoma A549 cells |

While popular biomedical knowledge bases such as SemMedDB contain causal predicates such as CAUSES, INHIBITS, STIMULATES, etc., from biomedical papers, they are not able to capture all the causal relations. The disclosed method augments the causal predications of SemMedDB (or any other existing technique like SemRep) through a knowledge-based method by extracting more CE relations. The disclosed method is a combination of an unsupervised machine learning technique to discover causal triggers and a set of high-precision linguistic rules to identify cause/effect arguments of these causal triggers. The method uses simple rules to extract additional arguments of the CE relations: negation and uncertainty.

Figure 2A:
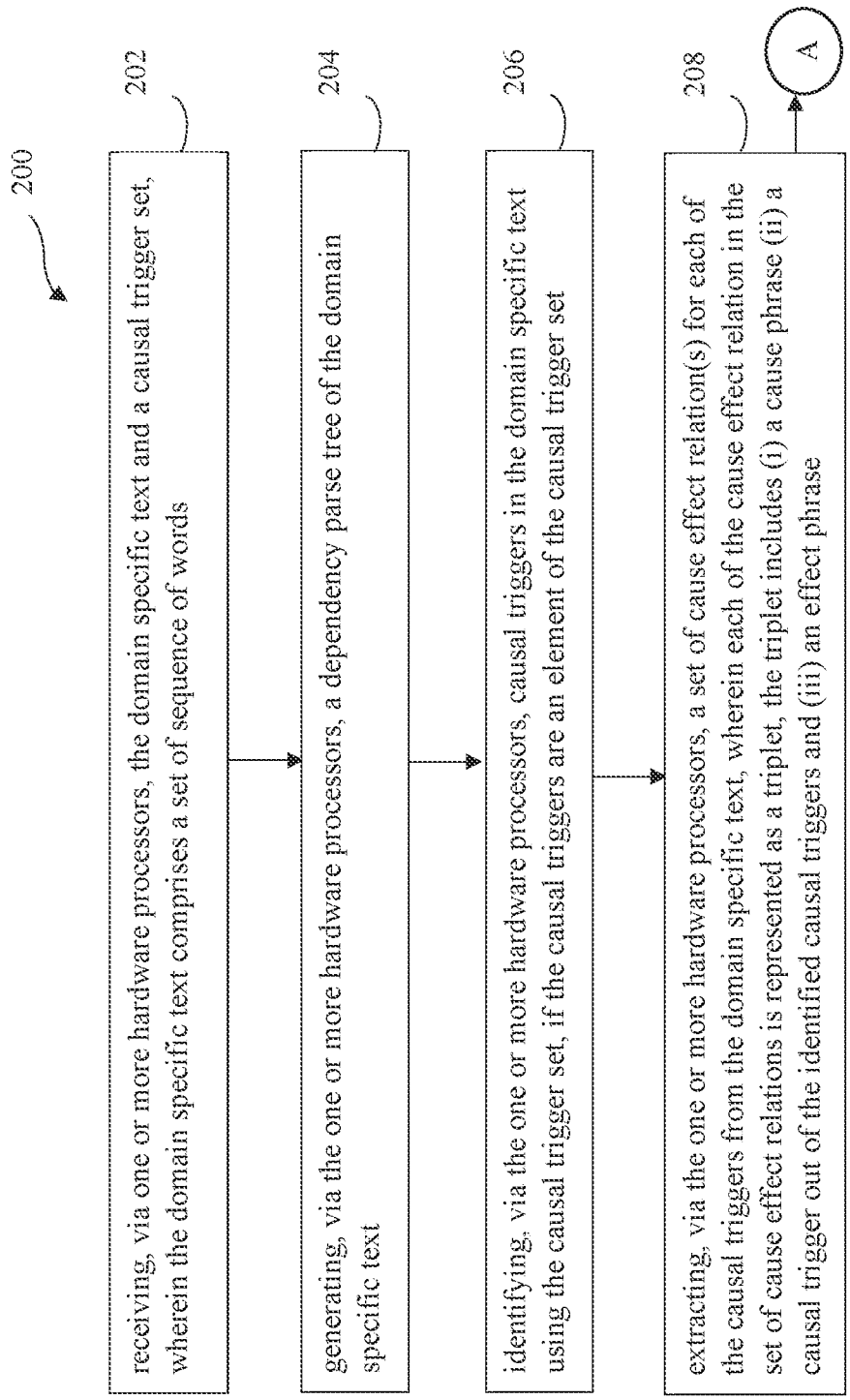
FIG. 2A through FIG. 2B is a flow diagram illustrating a method for extraction of cause-effect relation from domain specific text, in accordance with some embodiments of the present disclosure.
Figure 2B:
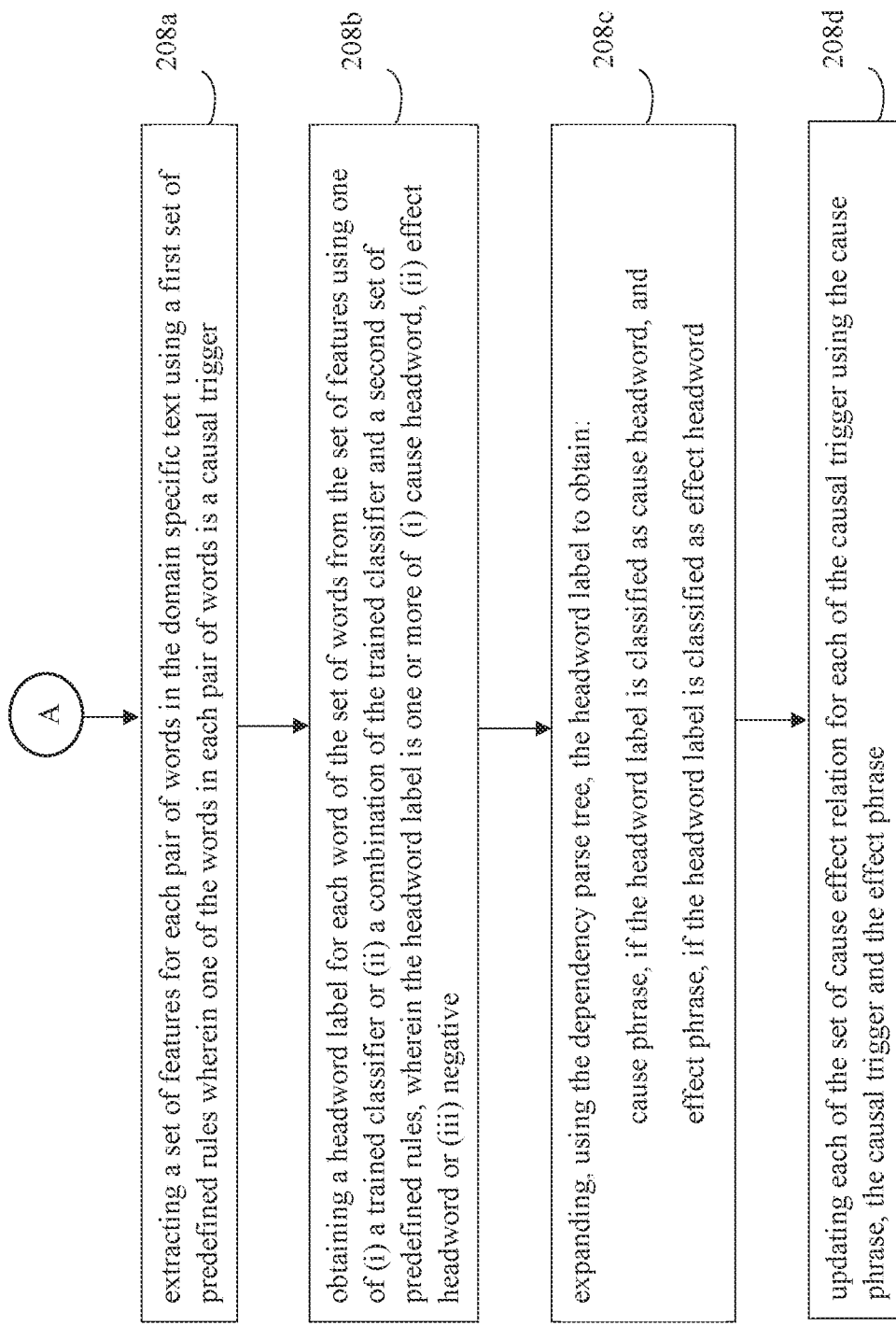

Referring now to the drawings, and more particularly to FIG. 1 through FIG. 2B, where similar reference characters denote corresponding features consistently throughout the figures, there are shown preferred embodiments and these embodiments are described in the context of the following exemplary system and/or method.

FIG. 1 illustrates an exemplary block diagram of a system 100 for extraction of cause-effect relation from domain specific text, according to some embodiments of the present disclosure. In an embodiment, the system 100 includes one or more processors 102, communication interface device(s) or input/output (I/O) interface(s) 106, and one or more data storage devices or memory 104 operatively coupled to the one or more processors 102. The one or more processors 102 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface (s) 106 may include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system for extraction of cause-effect relation from domain specific text may be stored in the memory 104.

domain specific text, this set is looked up for identifying causal triggers. Table 2 shows the complete list of domain-agnostic and domain-specific causal triggers.

TABLE 2

Domain-agnostic causal trigger cause of, causes of, cause for, causes for, reason for, reasons for, reason of, reasons of, as a consequence, as a result, due, because, activate, bring about, cause, contribute to, create, derive from, effect, elicit, entail, evoke, generate, give rise to, implicate in, lead to, originate in, provoke, result from, stem from, stimulate, trigger off, role Domain-specific causal trigger coadministrate, down-regulate, up-regulate, co-express, re-express, over-express, dysregulate, degranulate, knockdown, ablate, abrogate, accelerate, advance, affect, alter, attenuate, benefit by, benefit from, block, convert, decrease, degrade, delineate, deplete, deregulate, die of, diminish, discharge, disrupt, disseminate, divide, elevate, eliminate, enforce, enhance, enrich, eradicate, exacerbate, exert, expand, extend, fuse, govern, impact, impair, improve, increase, induce, infect, infiltrate, influence, inhibit, inject, intensify, kill, knock down, maximize, mediate, minimize, optimize, originate from, portend, prevent, produce, proliferate, prolong, protect, reactivate, reduce, regain, regulate, relapse, remove, replicate, repress, reproduce, rescue, restore, reverse, revert, sensitize, shorten, stabilize, substitute, suppress, transfer, transform, trigger, transplant, escalate, complicate, express, progress, decline, predispose, translate, secrete, unblock, grow, remit, remove, abolish, drive, modulate, amplify, antagonize, destruct, destroy, lower FIG. 2A through FIG. 2B is a flow diagram illustrating a method for extraction of cause-effect relation from domain specific text, in accordance with some embodiments of the present disclosure. In an embodiment, the system 100 comprises one or more data storage devices or the memory 104 operatively coupled to the one or more hardware processors 102 and is configured to store instructions for execution of steps of the method by the one or more processors 102. The steps of the method 200 of the present disclosure will now be explained with reference to components of the system 100 of FIG. 1.

In an embodiment of the present disclosure, the one or more processors 102 are configured to receive at step 202 the domain specific text and a causal trigger set, wherein the domain specific text comprises a set of sequence of words. The causal trigger set is stored in a database.

In an embodiment of the present disclosure, the one or more processors 102 are configured to generate at step 204 a dependency parse tree of the domain specific text. The dependency parse tree is generated using state-of-the-art methods such as Syntactic Dependency Parsing (spaCy).

In an embodiment of the present disclosure, the one or more processors 102 are configured to identify at step 206 causal triggers in the domain specific text using the causal trigger set, if the causal triggers are an element of the causal trigger set. A causal trigger comprises one or more words invoking a cause-effect relation in the domain specific text. The causal triggers can be domain agnostic (e.g., due to, because, caused) or domain-specific (e.g., inhibits, down-regulated). An unsupervised technique for automatically discovering the domain-specific causal verbs is employed. The technique creates a large list of causal verbs in bio-medical domain, using only unlabeled domain corpus and does not require any manual supervision. However, once the list is created, it is manually curated to retain only the high-precision causal verbs. The causal trigger set consisted of 109 domain-specific causal triggers and 33 domain-agnostic causal triggers. All the morphological variations (e.g., induced, inducing) and nominal forms (e.g., induction) of the causal verbs are also considered. Given any input In an embodiment of the present disclosure, the one or more processors 102 are configured to extract at step 208 a set of cause-effect relation(s) for each of the causal triggers from the domain specific text, wherein each of the cause-effect relation in the set of cause-effect relations is represented as a triplet, the triplet includes (i) a cause phrase (ii) a causal trigger out of the identified causal triggers and (iii) an effect phrase. A CE relation is represented in the form of a triplet which consists of:

(i) Causal trigger: A multi-word expression or a verb which invokes a CE relation, e.g., because, due to, causes, inhibits.

(ii) Cause phrase: A noun or verb phrase which represents a cause argument of the CE relation invoked by the causal trigger.

(iii) Effect phrase: A noun or verb phrase which represents an effect argument of the CE relation invoked by the causal trigger.

Consider the following sentence: PEDV belongs to the Alphacoronavirus genus and can cause an acute and highly contagious enteric disease. For this sentence, following CE triplet is extracted: <Causal trigger: cause, Cause-phrase: PEDV, Effect-phrase: an acute and highly contagious enteric disease>. Headwords of the cause and effect phrases are underlined. Intuitively, the headword of a phrase is often its most important word and grammatically, it is the ancestor of all the words in a phrase in the sentence's dependency parse tree.

In an embodiment of the present disclosure, the extraction of CE relations comprises of extracting at step 208a a set of features for each pair of words in the domain specific text using a first set of predefined rules wherein one of the words in each pair of words is a causal trigger. The set of features extracted are (i) lexical features (ii) Part-of-speech (POS) tag based features and (iii) dependency based features. The first set of predefined rules for generating the lexical features are as follows:

1. Text form of trigger verb
2. Text form of cause/effect headword
3. Lemma form of trigger verb
4. Lemma form of cause/effect headword The first set of predefined rules for generating the POS tag based features are as follows:
1. Specific part of speech of trigger verb
2. Specific part of speech of cause/effect headword
3. General part of speech of trigger verb
4. General part of speech of cause/effect headword The first set of predefined rules for generating dependency based features (based on the dependency parse tree of the sentence) are as follows:
1. Text form of parent of trigger verb
2. Text form of parent of cause/effect headword
3. Dependency relation with parent of trigger verb
4. Dependency relation with parent of cause/effect headword
5. Lemma form of the lowest common ancestor of the trigger verb and cause/effect headword.
6. Complete path of dependency relations from cause/effect headword to trigger verb in the sentence's dependency parse tree
7. Presence of a direct edge between trigger verb and cause/effect headword
8. Individual dependency relation types on the dependency path connecting the trigger verb to the cause/effect headword
9. Individual words on the dependency path connecting the trigger verb to the cause/effect headword Table 3 shows various features generated for a pair of causal trigger v and cause/effect headword u.

(ii) All the nouns in the sentence which are headwords of any base noun phrase, i.e., all the nouns whose dependency relation with their parent is not compound.

(iii) All other words which play a noun-like role in the dependency parse tree, i.e., the words whose dependency relation with their parents is one of the following: nsub/ (nominal subject), nsubjpass (passive nominal subject), dobj (direct object), pobj (prepositional object).

The features extracted at step 208a are designed to capture various lexical and syntactic characteristics about how any causal trigger v and its corresponding cause/effect argument headword u are mentioned in a given text. Then these pairs are classified such that each pair is labelled with any one of the following classes: (i) CAUSE (indicating that u is the headword of the "cause" argument of the causal trigger v), (ii) EFFECT (indicating that u is the headword of the "effect" argument of the causal trigger v), and (iii) NEGATIVE (indicating that u is not a cause/effect argument of the causal trigger v).

If manually annotated <v, u> pairs are available, then any supervised classifier can be trained for identifying the above classes. In an embodiment, the training of the classifier comprises receiving a training data and the causal trigger set. The training data is a set of annotated sentences wherein each sentence of the set of annotated sentences comprises (i) one or more cause-effect relation and (ii) one or more causal triggers. Further the training comprises generating a dependency parse tree using the state-of-the-art methods for each sentence of the set of sentences in the training data. A set of

TABLE 3

| | Lexical features: |
|---|---|
| (i) | Actual word tokens corresponding to v and u |
| (ii) | Rootwords (lemmas) of words corresponding to v and u: |
| | POS tag-based features: |
| (i) | Part-of-speech (POS) tags of the words corresponding to v and u |
| (ii) | Generalized POS tags of the words corresponding to v and u: |
| | Dependency based features: |
| (i) | Parents/governors in the dependency parse tree for v and u |
| (ii) | Dependency relation with parent in the dependency parse tree for v and u |
| (iii) | Whether v is an ancestor of u in the dependency parse tree |
| (iv) | Rootword of the "Lowest Common Ancestor" (LCA) of u and v in the dependency parse tree |
| (v) | Complete path of dependency relations from u to v in the sentence's dependency parse tree |
| (vi) | Whether there is a direct edge between u and v in the dependency parse tree |
| (vii) | Whether any particular dependency relation type lies on the dependency path connecting u to v |
| (viii) | Whether any particular word lies on the dependency path connecting u to v: NA (because, here u is directly connected to v) |

In an embodiment of the present disclosure, the extraction of CE relations comprises of obtaining at step 208b a headword label for each word of the set of words from the set of features using one of (i) a trained classifier or (ii) a combination of the trained classifier and a second set of predefined rules, wherein the headword label is one or more of (i) cause headword, (ii) effect headword or (iii) negative. For each candidate causal trigger v, headwords of its cause and effect argument phrases are identified. All the words in a given text which satisfy following conditions are identified as candidate headwords of a cause/effect phrase:

(i) All the verbs in the sentence which are not auxiliary of any other main verb, i.e., all the verbs whose dependency relation with their parent is not aux.

cause headword and a set of effect headword for each of the cause-effect relation is generated. Each of the cause-effect relation of the one or more cause-effect relation is associated to each of the causal trigger of the one or more causal triggers. The cause headword is the lowest common ancestor of the dependency tree of the corresponding cause phrase of the CE relation. Similarly, the effect headword is the lowest common ancestor of the dependency tree of the corresponding effect phrase of the CE relation. Further for training the classifier, a set of negative headword labels are obtained in the training data. The set of negative headword labels is a set of words in each sentence of the set of sentences and each word of the set of words is none of (i) a cause headword or (ii) an effect headword. A set of features are further extracted for the set of cause headword, the set of effect headword and for the set of headwords classified as negative using the first set of predefined rules. The classifier is trained using the set of features and its corresponding headword labels.

However, without manual intervention, using an unsupervised method the cause headwords and effect headwords can be identified using a second set of predefined rules. The second set of predefined rules for obtaining the cause headword are:

(i) the cause headword is a nominal subject of the causal trigger verb
(ii) the cause headword is a noun adverbial modifier of the causal trigger verb
(iii) the cause headword is a prepositional object of the agent of the causal trigger verb
(iv) the causal trigger verb is a relative class modifier of the cause headword and the causal trigger word is being modified by 'that'
(v) the cause headword is a noun is an object of the causal trigger word 'due'
(vi) there exists a Lowest Common Ancestor(LCA) in the dependency parse tree of the domain specific text such that the cause headword is a nominal subject modifier of the LCA and the causal trigger is an object of the preposition of the LCA.
(vii) the cause headword is a prepositional object of the preposition ('by') modifying the causal trigger noun.
(viii) the causal trigger verb is a relative clause modifier of the cause headword, 'which' is a child of the causal trigger verb, and the cause headword is not an attribute modifier of the cause headword.
(ix) there exists a Lowest Common Ancestor (LCA) in the dependency parse tree of the domain specific text such that the cause headword is a passive nominal subject modifier of the LCA and the causal trigger is open clausal complement modifier of the LCA.
(x) the root word of the causal trigger word is 'role' and there exists a Lowest Common Ancestor(LCA) in the dependency parse tree of the domain specific text such that the root word of the LCA is 'play', the cause headword is a nominal subject modifier of the LCA and the causal trigger is a direct object modifier of the LCA.

Table 4 shows the linguistic rules corresponding to the second set of predefined rules for cause headword identification above mentioned

TABLE 4

| R. No | Rule |
|---|---|
| 1 | AND: {dep.path.u<nsubj<v}; OR: {u.POS_gen.NOUN, u.POS_gen.PROPN}; NEG: {v.rootword.result} |
| 2 | AND: {dep.path.u<npadvmod<v} |
| 3 | AND: {v.POS_gen.VERB, dep.path.u<pobj<agent<v} |
| 4 | AND: {v.POS_gen.VERB, dep.path.u>relcl>v, v.child.that} |
| 5 | AND: {v.text.due, dep.path.u<pobj<v} |
| 6 | AND: {v.POS_gen.VERB, dep.path.u<nsubj<LCA>prep>pcomp>v} |
| 7 | AND: {v.POS_gen.NOUN, dep.path.u<pobj<prep<v, path.by} |
| 8 | AND: {v.POS_gen.VERB, dep.path.u>relcl>v, v.child.which}; NEG: {u.parent.dep.attr} |
| 9 | AND: {v.POS_gen.VERB, dep.path.u<nsubjpass<LCA>xcomp>v} |
| 10 | AND: {v.rootword.role, dep.path.u<nsubj<LCA>dobj>v, lca.rootword.play} |
| 11 | AND: {v.text.due, dep.path.u<pobj<prep<v, path.to} |
| 12 | AND:{v.POS_gen.NOUN, dep.path.u<nsubj<LCA>attr>v, v.rootword.cause} |
| 13 | AND: {v.rootword.cause}; OR: {dep.path.u<nsubjpass<LCA>xcomp>attr>v, dep.path.u<nsubjpass<LCA>prep>pobj>v, dep.path.u<dobj<LCA>prep>pobj>v} |
| 14 | AND: {v.POS_gen.VERB, v.POS.VBG, dep.path.u<nsubj<LCA>attr>acl>v} |
| 15 | AND: {v.POS_gen.VERB, dep.path.u<nsubj<v, u.POS_gen.VERB} |
| 16 | AND: {v.POS_gen.VERB, edge.v.u.csubj} |
| 17 | AND: {v.rootword.die, dep.path.len.1.of>pobj>u, dep.path.u<pobj<prep<v} |
| 18 | AND: {v.POS gen.VERB, dep.path.u<nsubj<LCA>xcomp>v} |
| 19 | AND: {v.rootword.result, v.child.from}; OR: {dep.path.u<pcomp<prep<v, dep.path.u<pobj<prep<v} |
| 20 | AND: {dep.path.u<nsubj<v, v.rootword.result, v.child.in}; OR: {u.POS_gen.NOUN, u.POS_gen.PROPN}; NEG: {v.child.from} |
| 21 | AND: {v.POS_gen.NOUN, dep.path.u<pobj<prep<v, dep.path.len.1.for>pobj>u}; OR: {v.rootword.consequence, v.rootword.result, v.rootword.effect} |
| 22 | AND: {v.text.because, dep.path.u<pobj<v} |
| 23 | AND: {v.POS_gen.VERB, v.POS.VBG, dep.path.u<nsubj<LCA>advcl>v} |
| 24 | AND: {v.POS_gen.NOUN, dep.path.u<nsubj<LCA >attr>v, v.rootword.reason} |
| 25 | AND: {v.POS_gen.VERB, dep.path.u<nsubj<LCA>acomp>prep>pcomp>v} |
| 26 | AND: {v.POS gen.VERB, dep.path.u<nsubj<LCA>acomp>xcomp>v} |
| 27 | AND: {v.text.because, dep.path.u>mark>v} |
| 28 | AND: {v.text.due, dep.path.u<pobj<pcomp<v, path.v.u.pcomp, path.v.u.pobj, ancestor.v.u, u.parent.dep.pobj, path.to} |
| 29 | AND: {v.POS_gen.VERB, dep.path.u<nsubj<LCA>attr>relcl>v, u.POS_gen.NOUN} |
| 30 | AND: {v.POS_gen.NOUN, u.POS_gen.NOUN, dep.path.u>appos>v}; OR: {v.rootword.inhibitor, v.rootword.predictor, v.rootword.marker, v.rootword.cause} |
| 31 | AND: {v.POS_gen.NOUN, dep.path.u<nsubj<LCA>attr>v}; OR: {v.rootword.inhibitor, v.rootword.predictor, v.rootword.marker, v.rootword.cause, v.rootword.complication} |

TABLE 4-continued

| R. No | Rule |
|---|---|
| 32 | AND: {dep.path.u<nsubj<LCA>xcomp>attr>v, u.POS_gen.NOUN, u.rootword.cause} |
| 33 | AND: {dep.path.u<csubjpass<LCA>xcomp>v}; NEG: {u.POS_gen.PRON} |

The second set of predefined rules for obtaining the effect headword are:
(i) the effect headword is a direct object of the causal trigger verb
(ii) the causal trigger verb is an adverbial modifier of the effect headword.
(iii) the effect headword is a passive nominal subject modifier of the causal trigger verb.
(iv) the causal trigger verb is a clausal modifier of the effect headword which is a noun.
(v) the causal trigger word ('because' or 'due') is a prepositional modifier of the effect headword.
(vi) the root form of the causal trigger verb is 'lead' and the effect headword is a prepositional object modifier of the preposition ('to') modifying the causal trigger verb.
(vii) the root word of the causal trigger is 'cause' or 'reason', the causal trigger verb is modified by the word 'by' and the effect headword is a prepositional object modifier of the preposition ('of') modifying the causal trigger noun.
(viii) the root form of the causal trigger verb is 'contribute' and the effect headword is a prepositional object modifier of the preposition ('to') modifying the causal trigger verb.
(ix) the root form of the causal trigger verb is 'role' and the effect headword is a prepositional object modifier of the preposition ('in') modifying the causal trigger verb.
(x) the causal trigger word 'because' is a marker of the adverbial clause modifier of the effect headword.

Table 5 shows the linguistic rules corresponding to the second set of predefined rules for effect headword identification above mentioned

TABLE 5

| R No | Rule |
|---|---|
| 1 | AND: {edge.v.u.dobj} |
| 2 | AND: {v.POS_gen.VERB, dep.path.u>amod>v} |
| 3 | AND: {edge.v.u.nsubjpass} |
| 4 | AND: {v.POS.VBN, edge.u.v.acl, u.POS_gen.NOUN, v.POS_gen.VERB} |
| 5 | AND: {dep.path.u>prep>v}; OR: {v.text.because, v.text.due} |
| 6 | AND: {v.POS_gen.VERB, v.rootword.lead, dep.path.u<pobj<prep<v, path.to} |
| 7 | AND: {v.POS_gen.NOUN, dep.path.u<pobj<prep<v, path.of}; OR: {v.rootword.cause, v.rootword.reason, v.child.prep.by, v.child.agent.by} |
| 8 | AND: {v.POS_gen.VERB, v.rootword.contribute, dep.path.u<pobj<prep<v, path.to} |
| 9 | AND: {v.rootword.role, dep.path.u<pobj<prep<v, path.in} |
| 10 | AND: {dep.path.u>advcl>mark>v, v.text.because} |
| 11 | AND: {v.rootword.result, v.child.from, dep.path.u<nsubj<v} |
| 12 | AND: {v.rootword.role, dep.path.u<pcomp<prep<v, path.in} |
| 13 | AND: {v.rootword.result, v.child.in}; OR: {dep.path.u<pcomp<prep<v, dep.path.u<pobj<prep<v} |
| 14 | AND: {v.POS_gen.NOUN, dep.path.u<pobj<prep<v, dep.path.len.1.for>pobj>u, v.rootword.cause} |
| 15 | AND: {v.POS_gen.NOUN, dep.path.u<pcomp<prep<v, dep.path.len.1.of>pcomp>u}; OR: {v.rootword.cause, v.rootword.reason} |
| 16 | AND: {v.POS.VBN, dep.path.u<nsubj<LCA>attr>acl>v, v.POS_gen.VERB} |
| 17 | AND: {edge.u.v, lca.rootword.be, v.text.due, u.copula verb with object} |
| 18 | AND: {v.rootword.die, dep.path.u<nsubj<v, v.child.of} |
| 19 | AND: {v.POS gen.NOUN, dep.path.u<pobj<prep<v, dep.path.len.1.for>pobj>u, v.rootword.reason} |
| 20 | AND: {v.text.due, dep.path.u<nsubj<LCA>acomp>v, lca.rootword.be} |
| 21 | AND: {v.text.due, dep.path.u>amod>v} |

The cause and effect headwords can be obtained using a combination of the trained classifier and the second set of predefined rules. The headwords which are not classified by the trained classifier are further classified as cause and effect headwords using the second set of predefined rules.

In an embodiment, the headword label is expanded using the dependency tree to obtain the cause phrase and effect phrase. The cause phrase is obtained if the headword label is classified as cause headword and the effect phrase is obtained if the headword label is classified as effect headword. Phrase for a headword is obtained by considering the span of the dependency subtree rooted at that headword by optionally excluding the nodes and corresponding subtrees of the trigger or any appositive, adverbial clause, etc. present. Words in conjunction with the identified headword are expanded as separate cause/effect phrases. Simple rules specification language is also used for specifying some exceptions for phrase expansion which are as follows:

1. An option to exclude children/dependants having certain dependency relations with their parents. Following dependency relations were excluded—punct (connects to punctuation symbols), appos (connects to an appositive phrase), advcl (connects to an adverbial clause)
2. An option to limit the phrase boundaries to the left/right of the trigger word. If the trigger word itself is a descendent of a cause/effect headword, then the cause/effect phrase boundaries will never include the trigger word and exceed beyond it.

In an embodiment, using the obtained cause phrase and effect phrase for each of the causal trigger, the set of CE relations are updated as triplet, the cause phrase, the causal trigger and the effect phrase. CE triplets are formed for each trigger v for which at least one candidate headword (say $u_1$) is identified as a cause headword and at least one another candidate headword (say $u_2$) is identified as an effect headword. Let $U_C$ be the set of CAUSE headwords identified for v and $U_E$ be the set of EFFECT headwords identified for v. Then, the final set of CE triplets associated with the trigger v is:

$$\{\langle u_1, v, u_2\rangle \mid \text{s.t. } (u_1, u_2) \in U_C \times U_E\}.$$

In addition to cause and effect arguments, two more arguments of a cause-effect relation are extracted: i) negation, and ii) uncertainty. If the causal trigger has a child in its dependency tree with dependency relation neg, then it is extracted as a negation argument. E.g., [Overnight incubation with 1 microM safrole]$_{Cause}$ did [not]$_{Negation}$ [alter]$_{Trigger}$ [cell proliferation]$_{Effect}$. Here, the causal trigger is alter is negated by not which is extracted as a negation argument. Similarly, if the causal trigger has a child in its dependency tree with dependency relation aux and it is from a set of uncertainty indicating words (such as may, might, would), then we extract it as an uncertainty argument. E.g., [Glucocorticoids]$_{Cause}$ [might]$_{Uncertainty}$ [induce]$_{Trigger}$ [the apoptosis of some types of AML cells]$_{Effect}$, just like that of some lymphoid leukemia cells. Here, the causal trigger is induce is modified by might which is extracted as an uncertainty argument.

EXPERIMENTAL RESULTS: In order to analyze the performance of the disclosed method on a substantial corpus, the number of CE relations extracted were compared by the disclosed method with that of SemRep. The precision of our CE triplets was estimated which are extracted over and above SemRep using a random sample. 100 CE triplets were randomly selected which are extracted from those sentences for which SemRep does not have any predication having a causal predicate. For analyzing the results, a human expert evaluated these triplets and assigned a score to each triplet. A scale was used to evaluate headword identification rules, i.e., 0 if completely incorrect, 1 if partially correct and 2 if completely correct. Two precision values were computed: i) strict precision is computed by considering partially correct to be incorrect, and ii) lenient precision is computed by considering the sum of scores of all triplets divided by 200. CORD-19 dataset: The disclosed method was able to extract from 45,702 triplets from 24,231 citations in the CORD-19 Dataset. For comparison, predications were extracted using SemRep 2018 model on the same citations, which is referred as SMRP-C. Out of all the predications extracted by SemRep 13,976 correspond to the causal predicates. Leukemia PubMed dataset: The disclosed method was applied on this corpus of 58,761 Leukaemia-related PubMed citations and obtained 152,655 cause-effect triplets. For comparison, a subset of SemMedDB was also considered for the same set of 58,761 PubMed citations, which is referred as SMDB-L. SemMedDB is constructed using SemRep only and hence instead of running SemRep, a subset of SemMedDB is considered. Out of 503,183 predications in SMDB-L, only 77,135 correspond to the causal predicates.

The disclosed method can extract almost twice the number of CE triplets as compared to SMDB-L (152,655 vs 77,135) and SMRP-C(45,702 vs 13,976).

Comparison with SemRep on Gold Datasets: It is not possible to estimate recall of the disclosed method (and also that of SemRep) on the entire corpora, because the true CE relation triplets present in the complete dataset is not known. Hence, in order to estimate recall along with precision, smaller datasets are considered but with manually annotated CE relations. Predications are extracted using the disclosed method as well as SemRep on these datasets and the accuracy is compared.

CORD-19 Gold: Cause-Effect relations were manually annotated for a subset of the CORD-19 dataset. This dataset is referred as COVID-19_gold. It consists of 25 citations containing 380 sentences and 134 Cause-Effect triplets. The annotations in this dataset are in the same format as that of CE triplets in the disclosed method—cause phrase, causal trigger and effect phrase.

SemRep_gold Dataset: A gold-standard dataset was obtained from SemRep website for semantic predications where subject/object arguments are manually annotated. This dataset is referred as SemRep_gold. This dataset contains 500 sentences annotated with 1371 semantic predications annotated by human experts. Out of these 1371 predications, only 258 correspond to causal predicates. Table 6 provides a performance of the disclosed method for Cause-Effect relation extraction as compared to SemRep over the gold-standard dataset.

TABLE 6

| Dataset | Approach | Precision | Recall | F1-measure |
|---------|----------|-----------|--------|------------|
| SemRep_gold | SemRep | 58.78 | 29.84 | 39.59 |
|  | Disclosed | 50.83 | 35.66 | 41.91 |
| COVID-19_gold | SemRep | 42.30 | 16.54 | 23.78 |
|  | Proposed | 61.46 | 50.37 | 55.37 |

It has been analyzed that extracted CE triplets from the disclosed method for low precision. One of the reasons is that unlike SemRep, the disclosed method does not restrict cause/effect phrases to be of certain "semantic types".

Hence, there are several False Positive extractions where cause/effect phrases may not be normalized to any UMLS concept. E.g., consider the sentence: IFN-alpha profoundly alters cytoskeletal organization of hairy cells and causes reversion of the hairy appearance into a rounded morphology. Here, the following CE triplet is extracted which is correct but not annotated in the gold-standard dataset and hence is counted as a False Positive: <IFN-alpha, causes, reversion of the hairy appearance into a rounded morphology>.

The embodiments of present disclosure herein address the problem of extraction of cause-effect relations from domain specific text using unsupervised machine learning technique to obtain causal triggers and high-precision linguistic rules to identify cause/effect arguments of these causal triggers. The extraction output is a triplet consisting of a cause phrase, a causal trigger and an effect phrase. The method extracted 45,702 CE triplets from the CORD-19 dataset corpus which is significantly more than number of causal predicates extracted by SemRep, a popular utility to extract semantic predications from Biomedical text.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for extraction of cause-effect relation from domain specific text, the method comprising:

receiving, via one or more hardware processors, the domain specific text and a causal trigger set, wherein the domain specific text comprises a set of sequence of words;

generating, via the one or more hardware processors, a dependency parse tree of the domain specific text;

identifying, via the one or more hardware processors, causal triggers in the domain specific text using the causal trigger set, if the causal triggers are an element of the causal trigger set; and extracting, via the one or more hardware processors, a set of cause-effect relation(s) for each of the causal triggers from the domain specific text, wherein each of the cause-effect relation in the set of cause-effect relations is represented as a triplet, the triplet includes (i) a cause phrase (ii) a causal trigger out of the identified causal triggers and (iii) an effect phrase, the extracting comprising:

extracting a set of features for each pair of words in the domain specific text using a first set of predefined rules wherein one of the words in each pair of words is a causal trigger, wherein the set of features are (i) lexical features (ii) Part-of-speech (POS) tag based features and (iii) dependency based features;

obtaining a headword label for each word of the set of words from the set of features using one of (i) a trained classifier or (ii) a combination of the trained classifier and a second set of predefined rules, wherein the headword label is one or more of (i) cause headword, (ii) effect headword or (iii) negative;

expanding, using the dependency parse tree, the headword label to obtain:
  cause phrase, if the headword label is classified as cause headword, and
  effect phrase, if the headword label is classified as effect headword; and updating each of the set of cause-effect relation for each of the causal trigger using the cause phrase, the causal trigger and the effect phrase, wherein for obtaining the trained classifier, the training comprises:

receiving a training data and the causal trigger set for training a classifier wherein the training data is a set of annotated sentences wherein each sentence of the set of annotated sentences comprises (i) one or more cause-effect relation and (ii) one or more causal triggers;

generating a dependency parse tree for each sentence of the set of sentences in the training data;

generating, using the dependency parse tree, a set of cause headword and a set of effect headword for each of the cause-effect relation of the one or more cause-effect relation associated to each of the causal trigger of the one or more causal triggers;

obtaining a set of negative headword labels in the training data wherein the set of negative headword labels is a set of words in each sentence of the set of sentences and each word of the set of words is none of (i) a cause headword or (ii) an effect headword;

extracting a set of features for the set of cause headword, a set of features for the set of effect headword and a set of features for the set of headword classified as negative using the first set of predefined rules;

training the classifier using the set of features and the corresponding headword label.

2. The processor implemented method as claimed in claim 1, wherein the causal trigger set comprises one or more causal triggers stored in a database.

3. The processor implemented method as claimed in claim 1, wherein a causal trigger comprises one or more words invoking a cause-effect relation in the domain specific text.

4. The processor implemented method as claimed in claim 1, wherein the second set of predefined rules for obtaining the cause headword are one or more of:
  (i) the cause headword is a nominal subject of the causal trigger verb
  (ii) the cause headword is a noun adverbial modifier of the causal trigger verb
  (iii) the cause headword is a prepositional object of the agent of the causal trigger verb
  (iv) the causal trigger verb is a relative class modifier of the cause headword and the causal trigger word is being modified by 'that'
  (v) the cause headword is a noun is an object of the causal trigger word 'due'
  (vi) there exists a Lowest Common Ancestor (LCA) in the dependency parse tree of the domain specific text such that the cause headword is a nominal subject modifier of the LCA and the causal trigger is an object of the preposition of the LCA;
  (vii) the cause headword is a prepositional object of the preposition ('by') modifying the causal trigger noun;
  (viii) the causal trigger verb is a relative clause modifier of the cause headword, 'which' is a child of the causal trigger verb, and the cause headword is not an attribute modifier of the cause headword;
  (ix) there exists a Lowest Common Ancestor (LCA) in the dependency parse tree of the domain specific text such that the cause headword is a passive nominal subject modifier of the LCA and the causal trigger is open clausal complement modifier of the LCA;
  (x) the root word of the causal trigger word is 'role' and there exists a Lowest Common Ancestor (LCA) in the dependency parse tree of the domain specific text such that the root word of the LCA is 'play', the cause headword is a nominal subject modifier of the LCA and the causal trigger is a direct object modifier of the LCA.

5. The processor implemented method as claimed in claim 1, wherein the second set of predefined rules for obtaining the effect headword are one or more of:
  (xi) the effect headword is a direct object of the causal trigger verb
  (xii) the causal trigger verb is an adverbial modifier of the effect headword;
  (xiii) the effect headword is a passive nominal subject modifier of the causal trigger verb;
  (xiv) the causal trigger verb is a clausal modifier of the effect headword which is a noun;
  (xv) the causal trigger word ('because' or 'due') is a prepositional modifier of the effect headword;
  (xvi) the root form of the causal trigger verb is 'lead' and the effect headword is a prepositional object modifier of the preposition ('to') modifying the causal trigger verb;
  (xvii) the root word of the causal trigger is 'cause' or 'reason', the causal trigger verb is modified by the word 'by' and the effect headword is a prepositional object modifier of the preposition ('of') modifying the causal trigger noun;
  (xviii) the root form of the causal trigger verb is 'contribute' and the effect headword is a prepositional object modifier of the preposition ('to') modifying the causal trigger verb;
  (xix) the root form of the causal trigger verb is 'role' and the effect headword is a prepositional object modifier of the preposition ('in') modifying the causal trigger verb;
  (xx) the causal trigger word 'because' is a marker of the adverbial clause modifier of the effect headword.

6. A system, comprising:
a memory storing instructions;
one or more communication interfaces; and
one or more hardware processors coupled to the memory via the one or more communication interfaces, wherein the one or more hardware processors are configured by the instructions to:
  receive the domain specific text and a causal trigger set, wherein the domain specific text comprises a set of sequence of words;
  generate a dependency parse tree of the domain specific text;
  identify causal triggers in the domain specific text using the causal trigger set, if the causal triggers are an element of the causal trigger set; and
  extract a set of cause-effect relation(s) for each of the causal triggers from the domain specific text, wherein each of the cause-effect relation in the set of cause-effect relations is represented as a triplet, the triplet includes (i) a cause phrase (ii) a causal trigger out of the identified causal triggers and (iii) an effect phrase, the extracting comprising:

extract a set of features for each pair of words in the domain specific text using a first set of predefined rules wherein one of the words in each pair of words is a causal trigger, wherein the set of features are (i) lexical features (ii) Part-of-speech (POS) tag based features and (iii) dependency based features;

obtain a headword label for each word of the set of words from the set of features using one of (i) a trained classifier or (ii) a combination of the trained classifier and a second set of predefined rules, wherein the headword label is one or more of (i) cause headword, (ii) effect headword or (iii) negative;

expand using the dependency parse tree, the headword label to obtain:

cause phrase, if the headword label is classified as cause headword, and effect phrase, if the headword label is classified as effect headword; and update each of the set of cause-effect relation for each of the causal trigger using the cause phrase, the causal trigger and the effect phrase, wherein to obtaining the trained classifier, the training comprises:

receiving a training data and the causal trigger set for training a classifier wherein the training data is a set of annotated sentences wherein each sentence of the set of annotated sentences comprises (i) one or more cause-effect relation and (ii) one or more causal triggers;

generating a dependency parse tree for each sentence of the set of sentences in the training data;

generating, using the dependency parse tree, a set of cause headword and a set of effect headword for each of the cause-effect relation of the one or more cause-effect relation associated to each of the causal trigger of the one or more causal triggers;

obtaining a set of negative headword labels in the training data wherein the set of negative headword labels is a set of words in each sentence of the set of sentences and each word of the set of words is none of (i) a cause headword or (ii) an effect headword;

extracting a set of features for the set of cause headword, a set of features for the set of effect headword and a set of features for the set of headword classified as negative using the first set of predefined rules;

training the classifier using the set of features and the corresponding headword label.

7. The system of claim 6, wherein the causal trigger set comprises one or more causal triggers stored in a database.

8. The system of claim 6, wherein a causal trigger comprises one or more words invoking a cause-effect relation in the domain specific text.

9. The system of claim 6, wherein the second set of predefined rules for obtaining the cause headword are one or more of:

(i) the cause headword is a nominal subject of the causal trigger verb (ii) the cause headword is a noun adverbial modifier of the causal trigger verb (iii) the cause headword is a prepositional object of the agent of the causal trigger verb (iv) the causal trigger verb is a relative class modifier of the cause headword and the causal trigger word is being modified by 'that'

(v) the cause headword is a noun is an object of the causal trigger word 'due'

(vi) there exists a Lowest Common Ancestor (LCA) in the dependency parse tree of the domain specific text such that the cause headword is a nominal subject modifier of the LCA and the causal trigger is an object of the preposition of the LCA;

(vii) the cause headword is a prepositional object of the preposition ('by') modifying the causal trigger noun;

(viii) the causal trigger verb is a relative clause modifier of the cause headword, 'which' is a child of the causal trigger verb, and the cause headword is not an attribute modifier of the cause headword;

(ix) there exists a Lowest Common Ancestor (LCA) in the dependency parse tree of the domain specific text such that the cause headword is a passive nominal subject modifier of the LCA and the causal trigger is open clausal complement modifier of the LCA;

(x) the root word of the causal trigger word is 'role' and there exists a Lowest Common Ancestor (LCA) in the dependency parse tree of the domain specific text such that the root word of the LCA is 'play', the cause headword is a nominal subject modifier of the LCA and the causal trigger is a direct object modifier of the LCA.

10. The system of claim 6, wherein the second set of predefined rules for obtaining the effect headword are one or more of:

(i) the effect headword is a direct object of the causal trigger verb (ii) the causal trigger verb is an adverbial modifier of the effect headword;

(iii) the effect headword is a passive nominal subject modifier of the causal trigger verb;

(iv) the causal trigger verb is a clausal modifier of the effect headword which is a noun;

(v) the causal trigger word ('because' or 'due') is a prepositional modifier of the effect headword;

(vi) the root form of the causal trigger verb is 'lead' and the effect headword is a prepositional object modifier of the preposition ('to') modifying the causal trigger verb;

(vii) the root word of the causal trigger is 'cause' or 'reason', the causal trigger verb is modified by the word 'by' and the effect headword is a prepositional object modifier of the preposition ('of') modifying the causal trigger noun;

(viii) the root form of the causal trigger verb is 'contribute' and the effect headword is a prepositional object modifier of the preposition ('to') modifying the causal trigger verb;

(ix) the root form of the causal trigger verb is 'role' and the effect headword is a prepositional object modifier of the preposition ('in') modifying the causal trigger verb;

(x) the causal trigger word 'because' is a marker of the adverbial clause modifier of the effect headword.

11. One or more non-transitory machine readable information storage mediums comprising one or more instructions, which when executed by one or more hardware processors causes a method for:

receiving the domain specific text and a causal trigger set, wherein the domain specific text comprises a set of sequence of words;

generating a dependency parse tree of the domain specific text;

identifying causal triggers in the domain specific text using the causal trigger set, if the causal triggers are an element of the causal trigger set; and extracting a set of cause-effect relation(s) for each of the causal triggers from the domain specific text, wherein each of the cause-effect relation in the set of cause-effect relations is represented as a triplet, the triplet includes (i) a cause phrase (ii) a causal trigger out of the identified causal triggers and (iii) an effect phrase, the extracting comprising:

extracting a set of features for each pair of words in the domain specific text using a first set of predefined rules wherein one of the words in each pair of words is a causal trigger, wherein the set of features are (i) lexical features (ii) Part-of-speech (POS) tag based features and (iii) dependency based features;

obtaining a headword label for each word of the set of words from the set of features using one of (i) a trained classifier or (ii) a combination of the trained classifier and a second set of predefined rules, wherein the headword label is one or more of (i) cause headword, (ii) effect headword or (iii) negative;

expanding, using the dependency parse tree, the headword label to obtain:

cause phrase, if the headword label is classified as cause headword, and effect phrase, if the headword label is classified as effect headword; and updating each of the set of cause-effect relation for each of the causal trigger using the cause phrase, the causal trigger and the effect phrase, wherein for obtaining the trained classifier, the training comprises:

receiving a training data and the causal trigger set for training a classifier wherein the training data is a set of annotated sentences wherein each sentence of the set of annotated sentences comprises (i) one or more cause-effect relation and (ii) one or more causal triggers;

generating a dependency parse tree for each sentence of the set of sentences in the training data;

generating, using the dependency parse tree, a set of cause headword and a set of effect headword for each of the cause-effect relation of the one or more cause-effect relation associated to each of the causal trigger of the one or more causal triggers;

obtaining a set of negative headword labels in the training data wherein the set of negative headword labels is a set of words in each sentence of the set of sentences and each word of the set of words is none of (i) a cause headword or (ii) an effect headword;

extracting a set of features for the set of cause headword, a set of features for the set of effect headword and a set of features for the set of headword classified as negative using the first set of predefined rules;

training the classifier using the set of features and the corresponding headword label.

* * * * *